United States Patent Office 3,198,989
Patented Aug. 3, 1965

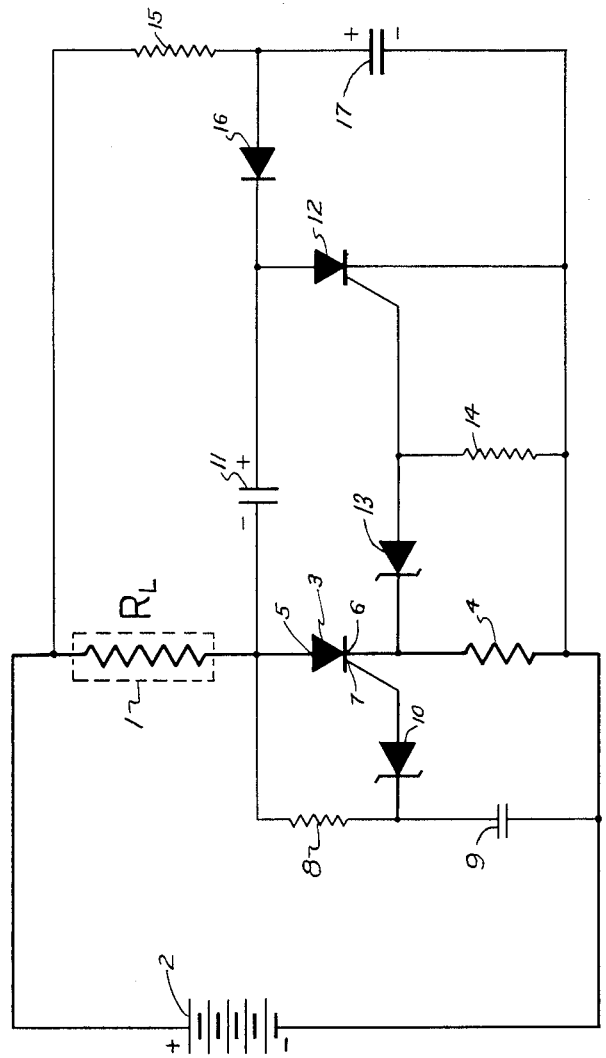

3,198,989
ELECTRONIC SWITCH DEVICE WITH COMMUTATING CAPACITOR
William J. Mahoney, Darien, Conn., assignor to American Machine & Foundry Co., New York, N.Y., a corporation of New Jersey
Filed Mar. 30, 1961, Ser. No. 99,454
8 Claims. (Cl. 317—33)

This invention relates to solid state electrical apparatus of the type employed to afford protection from excessive current flow through a load device.

Most types of electrical equipment are subject to damage by excessive current when momentary faults occur. Conventional fuses and circuit breakers can be employed to detect the excessive current resulting from the fault, and to shut down the equipment before damage from the excessive current occurs. In many applications, however, it is not practical to have the equipment shut down for more than a given time. Thus, in aircraft, for example, permanent shutdown of electrical equipment can be disastrous, and in other types of installations such permanent shutdown is generally undesirable. Under such circumstances, more complex overcurrent protecting devices are required, namely, "recycling" devices of the type which automatically re-establish service after a certain time delay sufficient to allow momentary faults to clear.

One application for automatic recycling overcurrent protecting apparatus is in combination with equiment subject to faults of the type which can be removed by turning off the equipment for a short interval. An electric arc is an example of such a fault. When the air resistance breaks down and an arc is established, a low resistance path results, permitting excessive current flow. The low resistance path may be removed by momentarily interrupting the service, so that the arc is quenched by current starvation and the high resistance of the air space is therefore re-established.

Various types of automatic recycling, overcurrent protective devices have been proposed in the past and recently it has been proposed to employ a device known as a controlled rectifier as the main "switch" for such devices. Thus, the controlled rectifier has been connected in series with the load device so that, once a gate pulse is applied to the control element of the rectifier, the rectifier remains conductive and passes load current. The controlled rectifier may be turned off, or commutated, when overload current is sensed by momentarily applying a reverse potential across the rectifier, the reverse potential being supplied by an electric storage device such as a charged capacitor. However, such arrangements have not been particularly successful in the past because the electric storage device could not be recharged quickly enough to permit rapid recycling operation.

Arrangements that have been employed in the prior art utilize an additional floating power supply to allow rapid recycling (General Electric Controlled Rectifier Handbook, Edition 1). Such a supply presupposes an external power source for its operation.

It is a general object of the present invention to provide an improved solid state overcurrent protecting device.

Another object is to provide an overcurrent protecting device employing a controlled rectifier, and which can be recycled at a rapid rate, and not requiring an auxiliary power source.

Still another object is to provide apparatus to rapidly charge an electrical storage device employed to commutate a controlled rectifier.

In order that the manner in which these and other objects are attained in accordance with the invention can be understood in detail, reference is had to the accompanying drawing, which forms a part of this specification, and wherein the single figure is a schematic representation of overcurrent protecting apparatus constructed in accordance with a particularly advantageous embodiment of the invention.

The present invention employs a main controlled rectifier as a switch element connected in series with the load device across a main source of power. When overload current is detected, a charge capacitor is electrically connected across the main controlled rectifier by means of a second controlled rectifier, so that the reverse potential from the capacitor can commutate or turn off the main controlled rectifier. The load device is thereby disconnected from the power source. A time delay circuit is employed to deliver a gate pulse to fire the main controlled rectifier from the power supply after commutation within a certain time period, so that the apparatus is automatically recycled. In order to rapidly charge the capacitor used to commutate the controlled rectifier, so that rapid recycling may take place, a second capacitor is used. The second capacitor is charged from the power supply while the main controlled rectifier is off and thereafter rapidly transfers its charge to the commutating capacitor when the controlled rectifier is conductive.

In the embodiment of the invention shown schematically in the drawing, a load device 1 is connected to source of power, such as battery 2, via controlled rectifier 3 and resistance 4. The load device 1 may be of any type subject to development of internal faults which cause excessive current flow. Controlled rectifier 3 includes a cathode 6, an anode 5 and a control element 7. A characteristic of a controlled rectifier is that, once a sufficient gating pulse is applied to the control element, the rectifier becomes conductive in the forward direction, i.e., plus to minus from anode to cathode, and remains conductive in the forward direction even after the gating pulse is removed. Thus, once a gate pulse is applied to control element 7, the controlled rectifier 3 fires and permits current to flow through load device 1 indefinitely.

A circuit which can be employed advantageously to develop a gating pulse for controlled rectifier 3 includes resistance 8 and capacitor 9 serially connected across controlled rectifier 3 and resistance 4. A Zener diode 10 is connected between control element 7 and the junction between resistance 8 and capacitor 9. Whenever controlled rectifier 3 is non-conductive, current flows from power source 2 through resistance 8 to charge capacitor 9. When the charge on capacitor 9 builds up to a sufficient potential, the Zener diode 10 "breaks down," becoming conductive to apply a potential to control element 7, thereby firing the controlled rectifier 3 and rendering it conductive in the forward direction. Once the controlled rectifier has become conductive, there is virtually no potential applied to capacitor 9 and therefore the capacitor discharges through the controlled rectifier. Thus, a gating signal is applied to control element 7 to fire the controlled rectifier a certain time period after the controlled rectifier is turned off, this time period being determined by the delay required to charge capacitance 9 through resistance 8 and the resistance $R_L$ of load device 1.

The circuit employed to commutate the controlled rectifier 3 includes capacitor 11 and controlled rectifier 12 connected in series across the series combination of controlled rectifier 3 and resistance 4. The circuit employed to develop a firing signal for controlled rectifier 12 includes Zener diode 13 and resistance 14 serially connected across resistance 4. The control element of controlled rectifier 12 is connected to the junction between Zener diode 13 and resistance 14. As the current flow through the load device 1 increases, the potential developed across resistance 4 increases. When this potential increases to a predetermined value, Zener diode 13 breaks down and becomes conductive, developing a potential across resistance 14 which is sufficient to fire controlled rectifier 12. When controlled rectifier 12 becomes conductive, capacitor 11 is effectively connected directly across controlled rectifier 3 and resistance 4. Assuming that capacitor 11 is charged with the polarity shown, a reverse potential is applied across controlled rectifier 3, i.e., the negative plate of capacitor 11 is connected to anode 5 and the positive plate of capacitor 11 is connected to cathode 6 via controlled rectifier 12 and resistance 4. Accordingly, if resistance 4 is kept to a sufficiently low value, the controlled rectifier 3 is thereby commutated by the application of the polarized charge on capacitor 11 thereto and turns off whenever excessive current flows through the load impedance 1.

The charging time of capacitor 11 is the main barrier to rapid recycling of such a circuit. Presumably, capacitor 11 could be charged with the polarity shown by current flow from the positive terminal of battery 2, through resistance 15, diode 16, and capacitor 11, controlled rectifier 3, and resistance 4 to the negative terminal of the battery. This circuit, however, permits charging of capacitor 11 only when controlled rectifier 3 is conductive. On some occasions, a fault may be present at the moment when controlled rectifier 3 is fired, and therefore capacitor 11 must be charged very rapidly in order to be effectively available to commutate controlled rectifier 3 within a short period of time, e.g., several microseconds. To achieve such a rapid charge, resistance 15 must have a very low value, on the order of several tenths of an ohm. However, resistance 15 must be of a sufficiently high value to prevent any substantial current flow from the battery through resistance 15, diode 16, and controlled rectifier 12 so that the controlled rectifier can be commutated by current starvation after capacitor 11 discharges.

The addition of capacitor 17 makes rapid charging of capacitor 11 possible while maintaining resistance 15 at a high value. The charging circuit therefor includes resistance 15 and capacitor 17 serially connected across battery 2. Diode 16 is connected to the junction between resistance 15 and capacitor 17 and to the junction between capacitor 11 and controlled rectifier 12. Resistance 15 is of a sufficiently high value (several thousand ohms) to prevent any substantial current from flowing through diode 16 and controlled rectifier 12 so that controlled rectifier 12 can be commutated by current starvation subsequent to the discharge of capacitor 11. Capacitor 17 can be charged, with the polarity shown in the drawing, at a relatively slow rate through resistance 15 during the time when controlled rectifier 3 is not conducting. When controlled rectifier 3 conducts, half of the charge existing across capacitance 17 (assuming capacitor 17 and 11 being of equal value), is transferred to capacitor 11 almost instantaneously through the low resistance path including diode 16, capacitor 11, conducting controlled rectifier 3, and resistance 4. Diode 16 prevents any current flow in the reverse direction, which current tends to flow because of the inductance in the various lines and, if not blocked, could result in an inductive kick producing a current in the reverse direction, through capacitor 11, capacitor 17, resistor 4 to the cathode of controlled rectifier 3, thus spuriously commutating said controlled rectifier.

The operation of the overcurrent protection device may be summarized as follows:

As soon as battery 2 is connected to the apparatus, capacitor 9 begins to charge to develop a gating pulse for controlled rectifier 3. The time required to develop this gating pulse may be on the order of 1.0 second. During this 1.0 second, capacitor 17 is also charging and achieves better than 90% of full charge before controlled rectifier 3 is fired. When controlled rectifier 3 fires, current flow is permitted through load device 1, thus connecting the load device to the battery 2. Also, when controlled rectifier 3 is fired, a charge is transferred from capacitor 17 to capacitor 11 in a few microseconds and the circuit is therefore operative to respond to overload currents within a few microseconds after controlled rectifier 3 is fired.

If an overload current occurs, controlled rectifier 12 is fired, effectively connecting capacitor 11 across controlled rectifier 3 to commutate controlled rectifier 3, and discharging capacitor 17 through diode 16 and controlled rectifier 12. After controlled rectifier 3 has been turned off, but controlled rectifier 12 is still conducting, capacitor $C_{11}$ will continue to charge up in the reverse direction, with its left electrode assuming a positive charge, and its right electrode being connected to the negative terminal of battery 2 through controlled rectifier 12. When this capacitor is fully charged, its charging current will drop to a low value. As mentioned above, the resistor 15 is of sufficiently high value to limit the current flow through diode 16 and controlled rectifier 12 to a value below the holding current of controlled rectifier 12. When the sum of currents flowing from battery 2 through the parallel paths comprising load $R_L$, capacitor $C_{11}$, resistor 15, and diode 16, respectively, drops below the holding current level of controlled rectifier 12, the controlled rectifier will drop out of conduction and assume its non-conducting state. At this point, capacitors 9 and 17 again begin to charge, thus repeating the entire cycle. This cycle may repeat indefinitely, automatically connecting and disconnecting the battery from the load impedance 1 until the fault or source of excessive current is eliminated.

While only a single, particularly advantageous embodiment of the present invention is shown, it will be obvious to those skilled in the art that numerous changes and modifications can be made therein without departing from the scope of the invention as pointed out more particularly in the appended claims.

What is claimed is:

1. In an electrical apparatus for commutating a controlled rectifier which when conducting supplies energizing current to a load from a source of power, the combination with the load of a first and second electrical storage device, charging means connected to said second storage device to charge that storage device from said source when the controlled rectifier is nonconducting, transfer circuit means connected to said first and second storage devices to transfer stored electrical energy from said second storage device to said first electrical storage device when the controlled rectifier is conducting, and commutating circuit means including said first storage device for selectively connecting said first storage device so charged to the controlled rectifier to commutate that rectifier when conducting to supply said load, whenever a predetermined undesired electrical condition exists in said load.

2. An electrical apparatus in accordance with claim 1 wherein said transfer circuit means includes the controlled rectifier and is connected to permit the transfer of electrical energy through the controlled rectifier when that rectifier is conductive.

3. In an electrical apparatus for commutating a controlled rectifier operating as a switch to control the energization of a load device from a source of power, the combination with the load device of a first and a second capacitor, charging means connected to said second capacitor to charge that capacitor from said source when the controlled rectifier is nonconducting, electrical transfer circuit means including the controlled rectifier and connected to said capacitors to permit said second capacitor to charge said first capacitor with its stored energy through the controlled rectifier when the controlled rectifier is conductive, commutating circuit means including said first capacitor for electrically connecting said first capacitor with its stored charge to the controlled rectifier to commutate that rectifier when conducting to energize said load device, whenever a predetermined undesired electrical condition exists in said load device therein, and means to cause the rectifier to become conductive a predetermined short time interval after its commutation so as to cause discharge of said second capacitor through said rectifier.

4. In an electrical apparatus for energizing a load device from a source of power, the combination of a first and a second capacitor, charging means connected to said second capacitor for charging that capacitor from said source, a first controlled rectifier which when conducting supplies energizing current to said load device from said source, first circuit means connected to said first and second capacitors and including said first controlled rectifier for permitting transfer of charge from said second capacitor to said first capacitor through said first controlled rectifier when that rectifier is conductive, a second controlled rectifier, and second circuit means including said second controlled rectifier operative to selectively connect said first capacitor with its stored charge across said first controlled rectifier to commutate that rectifier when conducting to energize said load device whenever a predetermined undesired electrical condition occurs therein.

5. In an overcurrent protection device energized from a source of electrical potential through a first controlled rectifier, said first rectifier being serially connected between said source and said load and adapted to permit current flow through the load when that rectifier is conductive, said device including a first and a second capacitor, first electrical circuit means including said second capacitor and operative to charge that capacitor from said source when said first rectifier is nonconducting, second electrical circuit means for rapidly transferring the electrical charge from said second to said first capacitor when said first rectifier becomes conductive, electrical commutation circuit means connected to said first rectifier and including a second controlled rectifier and said first capacitor, and overload current sensing means associated with said load and said second rectifier and operative in response to a predetermined overload current value in said load to cause said second rectifier to conduct and connect said first capacitor across said first rectifier to effect commutation thereof.

6. In an overcurrent protection device for a load energized from a source of electrical power through a controlled rectifier, said rectifier being serially connected between said source and said load and adapted to permit current flow therebetween when said rectifier becomes conductive, said device including a first and a second capacitor, first electrical circuit means including said second capacitor and a first resistor in series therewith adapted to charge that capacitor from said source when said rectifier is nonconducting, second electrical circuit means for rapidly transferring the charge from said second to said first capacitor when said rectifier becomes conductive, overload current sensing means associated with said load and including said first capacitor operative in response to a predetermined overload current value in said load to selectively connect said first capacitor with its charge across said rectifier to cause commutation thereof, and control means including timing means connected between said source and said rectifier and said first electrical means for preventing that rectifier from remaining in the nonconducting condition after commutation for more than a predetermined time interval.

7. The device of claim 6, in which the said circuit control means includes a third capacitor and a second resistor in series responsive to the potential from said source to render said controlled rectifier conductive, and the gating time constant of said rectifier through said third capacitor and said second resistor is selected with respect to the charging time constant of said second capacitor and said first resistor to properly control the period of time for which said controlled rectifier remains conductive.

8. The device of claim 7, in which the charging time constant of said first resistor and said second capacitor is made less than the gating time constant of said third capacitor and said second resistor so that the second capacitor precharges to the desired value before the load bearing controlled rectifier is caused to turn on into a fault in response to a predetermined overcurrent in the load.

References Cited by the Examiner

UNITED STATES PATENTS

| 2,866,106 | 12/58 | Schuh | 317—51 |
| 3,015,739 | 1/62 | Manteuffel | 307—88.5 |
| 3,133,209 | 5/64 | Greenwood et al. | 307—88.5 |

OTHER REFERENCES

"Applications and Circuit Design Notes," Solid State Products Inc., Bulletin D420–02; page 17; August 1959.

"Controlled Rectifier Manual," General Electric Co., pages 164–165, Figure 9.13; Mar. 21, 1960.

SAMUEL BERNSTEIN, *Primary Examiner.*